United States Patent [19]

Dumont et al.

[11] 3,923,839

[45] Dec. 2, 1975

[54] METHOD OF TREATING THE RESIDUES FROM THE DISTILLATION OF PHTHALIC ANHYDRIDE

[75] Inventors: Rene Dumont, Autreville; Maurice Goharel; Jean-Claude Lafont, both of Sinceny, all of France

[73] Assignee: Rhone-Progil, Courbevoie, France

[22] Filed: Apr. 2, 1974

[21] Appl. No.: 457,190

[30] Foreign Application Priority Data

Apr. 5, 1973 France .............................. 73.12301

[52] U.S. Cl. ............................................. 260/346.7
[51] Int. Cl.² ........................................ C07D 307/89
[58] Field of Search ....................... 260/346.7, 346.4

[56] References Cited
UNITED STATES PATENTS
3,420,750   1/1969   Schaefer et al. ................. 260/346.7

Primary Examiner—Harry I. Moatz

[57] ABSTRACT

Method of treating residues from the distillation of phthalic anhydride, avoiding pollution of the atmosphere and the zones for the discharge of such residues, and permitting easy handling of said residues. The method comprises drawing off a certain amount of the bottoms from the distillation column, subjecting the product drawn off to a thin layer evaporation operation, and spraying water onto the stream of the heavy fraction which flows away after said evaporation operation, and then collecting the product in water which is thus cooled and granulated.

4 Claims, 1 Drawing Figure

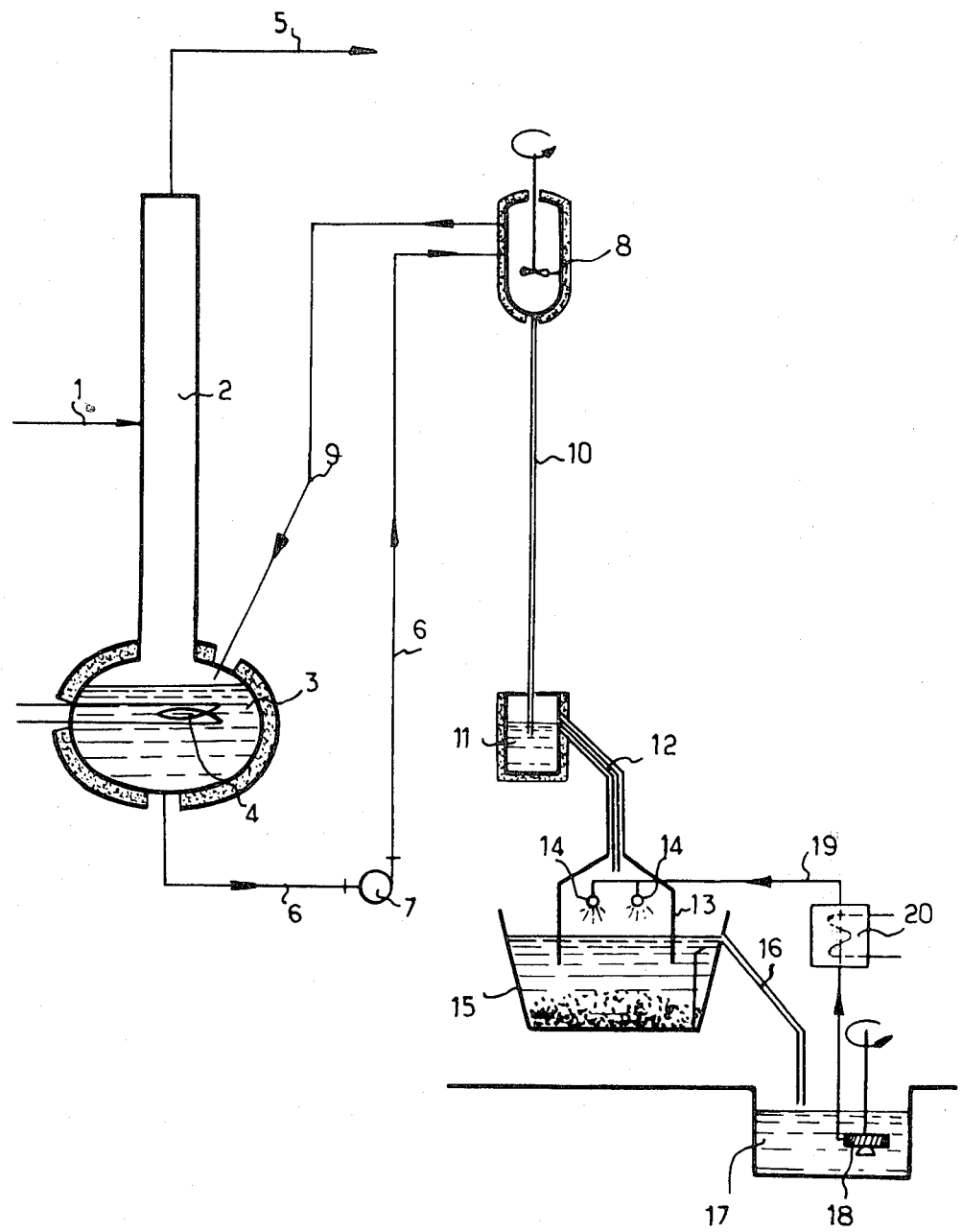

METHOD OF TREATING THE RESIDUES FROM THE DISTILLATION OF PHTHALIC ANHYDRIDE

The invention concerns a method of treating the bottoms products from the distillation of phthalic anhydride, whereby it becomes possible to recover the major part of the anhydride present in the bottom products, and moreover putting the heavy residues into a solid form which can be easily handled, while preventing pollution of the water or soil in which the waste products are discharged or stored.

After being condensed from the effluent gases from oxidation reaction vessels, crude phthalic anhydride is generally subjected, possible after an aging stage, to two successive distillation operations, one of which is intended to remove the light fractions containing impurities, while the other is intended to separate the substantially pure phthalic anhydride. The residues comprising the heavy products, which flow into the boiler of the second column, contain a substantial proportion of phthalic anhydride. This mixture occurs in the form of a liquid which is slightly viscous when hot. It is difficult to separate the residual anhydride, while the removal of the waste products is a source of pollution and the handling thereof is difficult because of their physical condition, irrespective of the operating conditions of the column.

The present invention remedies these various difficulties.

The object of this invention is a method of treating the residues from the distillation of phthalic anhydride, comprising drawing off, from the boiler of the anhydride distillation column, an amount of product such that the volume of the bottoms product remains substantially constant, subjecting the product drawn off to a thin-layer evaporation operation at a reduced pressure, re-cycling to the boiler the lightest fraction which essentially comprises phthalic anhydride vapors, passing the heavy fraction into a column of small cross-section, then spraying water onto the liquid stream flowing from the lower part of said column, the zone in which the water spraying action is effected and through which the residues flow before being cooled, being isolated from the atmosphere by a chamber having its lower open portion immersed in a volume of water at the bottom of which are deposited the residues which are thus granulated and solidified.

The required amount of bottoms product is preferably drawn off continuously from the lower portion of the boiler. It is obviously important for the flow rate of the product drawn off not to interfere with the distillation, hence the necessity for maintaining the level of product in the boiler substantially constant. The drawing-off operation can be discontinuous; the product drawn off is stored in a tank and passed continuously into the thin-layer evaporator.

The bottoms product comprises the heavy fractions of the mixtures subjected to distillation, but also a certain amount of phthalic anhydride which is entrained by the flow of heavy products. The feed into the column occurs at a given level and the major part of the anhydride moves upwardly towards the head of the column, while the base of the column generally contains from 80% to 50% by weight of anhydride which, due to the relatively low viscosity of the hot mixture, facilitates entrainment thereof into a conduit by a pump. The method of the invention could however operate outside the above specified limits.

The active surface area of the thin-layer evaporator, in which the product is spread out, for example, by a bladed rotor, is preferably from 10 to 2.50 sq. m per ton of bottoms product treated per hour. The thickness of the layer is less than 5 mm. It is obvious that the surface area of the thin layer can be increased, but that causes a pointless investment expense. The pressure in the evaporator is preferably from 60 to 300 mm of mercury and the temperature at the internal surface is from 230° to 280°C, that is to say, a little higher than the boiling temperature of the phthalic anhydride at the prevailing pressure.

The heavy fraction leaves the evaporator by flowing into tube members and through a liquid reserve acting as a hydraulic guard means. Upon issuing from the last tube member, the liquid stream, which is of small cross-section, flows into a tank containing water, passing through a space in which spraying nozzles direct water at a temperature which can be from 0 to 100°C onto the liquid stream.

Under the effect of the physical and mechanical action of the water, the residual product is thus converted into solid grains which deposit at the bottom of the tank. The water flow rate is preferably higher than 8 cu.m/hour per ton of bottoms product treated per hour. The assembly of the spraying nozzles is disposed under a cover member, the upper portion of which is closed as it embraces the flow tube, close to the lower opening thereof, and which is immersed to a depth of at least 5 mm into the water tank receiving the grains of product. The cover member therefore defines a volume which is isolated from the atmosphere, thereby preventing any toxic or corrosive vapors escaping into the atmosphere.

The condensed grains, having a mean equivalent diameter of from 1 to 20 mm, are then picked up by means of shovels or mechanical means, and stored or destroyed. When cold, they do not give off any odor and their solubility in water, which is virtually zero, prevents any pollution during handling or storage. In a preferred embodiment of the method, the water is received in a tank and then re-cycled, which avoids the emission of liquid effluents.

The method is described below in greater detail, together with the apparatus intended for carrying out the method, with reference to the accompanying drawing. This description is given for the purposes of illustration and is not intended in any way to reduce the scope of the invention.

The FIGURE shows a diagram of the apparatus for treating the residues from the distillation of phthalic anhydride in accordance with the practice of this invention.

The phthalic anhydride, of which the head has been removed, passes by way of the conduit 1 into the distillation column 2 mounted upon a boiler 3 in which the heating means is diagrammatically shown at 4. The purified anhydride is collected at the head by means of the conduit 5. A certain amount of the contents of the boiler is drawn off from the lower portion of the vessel and directed by a pump 7 through the conduit 6 towards the thin-layer evaporator 8, which is heated by a heat-carrier fluid circuit (not shown). The vaporized light fraction is re-introduced into the boiler by way of the conduit 9. The heavy fraction flows out by way of the tube member 10 to the reservoir 11, in which the tube is immersed to a level below the mouth of the over-flow tube member 12. The tube member 10 is substantially vertical but can possibly be inclined, in order to permit easier assembly of the installation. The cross-section of this tube member must permit the residues to flow without obstruction. Its length must be sufficient for the pressure applied to the liquid of the tank, by the column of liquid contained in the tube member, to be higher than the difference between atmospheric pressure and the residual pressure in the evaporator. It is obviously necessary for the cross-section of the tube member and the maximum volume of liquid above its open end in the reservoir to be calculated so that the opening is constantly immersed.

The liquid flowing from the evaporator is kept in the tube members 10 and 12 and in the reservoir 11 at a temperature such that no vapor bubbles are formed in the body of the liquid, and the viscosity of the liquid remains sufficient, that is to say, a temperature of the order of that obtained in the evaporator or lower than that temperature by less than 30°C. This temperature is maintained by a heated casing or jacket (not shown) which encloses those portions of the apparatus.

A cylindro-conical cover member 13 of sheet metal or plastics material, for example, is secured to the tube member 12 adjacent the end thereof.

The thin stream of liquid flowing from the tube member 12 is solidified and converted into grains by means of a flow of water which is sprayed by means of nozzles arranged below the cover member 13, at a distance and with an orientation such that the jets thus formed impinge on the fine stream of liquid. The material, which is thus divided and solidified, is deposited at the bottom of the tank 15. The water flows from this tank, by way of an overflow 16 which is welded to the tank at a level above the lower edge of the cover member, to a reservoir 17 from which an immersed pump 18 discharges it through the conduit 19 and possibly a heat exchanger 20, which is disposed on the conduit 19 and which reduces the temperature of the water between 85° and 0°C, to the spraying nozzles.

Two examples are hereinafter given solely for the purposes of illustrating the method, and are not to be considered as restricting the scope of this invention.

EXAMPLE 1

3500 kg/h of phthalic anhydride, produced by the oxidation of o-xylene and which has previously had the head removed, is distilled in a column under a head pressure of 60 mm of mercury. 105.4 kg/h of bottoms product is drawn off from the boiler of the distillation column, and directed into a thin-layer evaporator in which the pressure is 200 mm of Hg, which was an internal diameter of 33.8 cm and an active surface area of 1 sq.m, the bladed rotor turning at a speed of 750 r.p.m. and the end of the moving blades spaced 5 mm from the walls. The temperature of the product, which is 220°C at the inlet, is maintained by the circulation, through a jacket surrounding the evaporator of a heat-exchange fluid whose temperature at the outlet is 270°C.

The light fraction, which essentially comprises phthalic anhydride, is re-cycled to the boiler. The unevaporated products flow from the evaporator, at the base thereof, by way of a vertical tube member having an internal diameter of 32 mm and a height of 9 m above a reserve containing 15 liters of the same liquid, into which it is immersed. The product flows from the reserve by way of an overflow tube member having an internal diameter of 32 mm. The above two tube members and the reservoir are maintained at a temperature of 255°C ± 5°C.

Three cubic meters/h of water, at a temperature of from 20° to 25°C, is projected onto the liquid flowing from the outlet of the overflow tube member, by means of four nozzles arranged 40 cm from the end of the tube member and at the level thereof. A cylindro-conical cover member, having a diameter of 0.8 m and a total height of 1.2 m is so arranged as to contain the nozzles. The lower edge of the cover member is immersed by 10 cm into a tank containing 2 cu.m of water.

In this way 28 kg of product, comprising 21 kg of heavy product and 7 kg of phthalic anhydride, is collected in the form of grains having a mean diameter of 2 mm, that is to say, the loss of phthalic anhydride entrained by the residues is less than 0.2% of the amount produced by the oxidation operation.

EXAMPLE 2

A similar treatment is carried out by means of the same apparatus, on effluent gases from the reaction vessel for the oxidation of naphthalene. The feed flow rate to the phthalic anhydride distillation column is 3500 kg/h. 280 kg/h of bottoms product is drawn off and treated in a similar manner to that described above in the previous example. The heat-exchange fluid, issuing from the evaporator, is at a temperature of 280°C, the guard reservoir and its overflow tube member being maintained at a temperature of 267°C. At the end of the operation, 87.5 kg of granulated product is collected having a mean diameter of 3.5 mm, containing 70 kg of heavy residues. The phthalic anhydride loss represents 0.5% of the crude product subjected to the distillation operation.

EXAMPLE 3

Using the same apparatus, but in which the cooling heat exchanger on the water circuit has been removed, treatment is carried out on the residues from a distillation column which is fed with 3500 kg/h of crude phthalic anhydride from which the head has been removed, from the oxidation of o-xylene. 105.4 kg/h of bottoms product is passed into the evaporator; the heat-exchanger fluid issues at a temperature of 275°C, the outlet reservoir and the tube members being maintained at a temperature of 280°C. The spray water circuit, with the flow rate mentioned above, stabilizes at 92°C; 26.9 kg of residues containing 5.9 kg of phthalic anhydride and 21 kg of heavy products are collected in the water. The phthalic anhydride loss in the residues represents 0.17% of the crude product treated.

We claim:

1. A method of treating the residues from the distillation of phthalic anhydride from the oxidation product of ortho xylene or naphthalene, characterized in that it comprises drawing off from the boiler of the distillation column for distilling said anhydride, an amount of product such that the volume of the bottoms product remains substantially constant, subjecting the product drawn off to a thin-layer evaporation operation at a temperature within the range of 230°–280°C and a pressure within the range of 60–300 mm of mercury, recyling to the boiler the lightest fraction which essentially comprises phthalic anhydride vapors, passing the heavy fraction into the column of small cross-section, spraying water at a temperature of 0–100°C onto the liquid stream flowing from the lower part of the column, isolating from the atmosphere the zone in which the water spraying action is effected and through which the residues flow before being cooled, by a chamber the lower open portion of which is immersed in a volume of water at the bottom of which are deposited and residues which are cooled to solidification temperature and granulated by the water spray.

2. A method of treating the residues from the distillation of phthalic anhydride as claimed in claim 1, characterized in that the bottoms product contains from 80 to 50% of phthalic anhydride.

3. A method of treating residues from the distillation of phthalic anhydride, as claimed in claim 1, characterized in that the surface area of the thin layer is from 10 to 2.50 sq. m. per ton of product treated per hour, and the pressure at which evaporation is effected is from 60 to 300 mm of mercury.

4. A method of treating the residues from the distillation of phthalic anhydride as claimed in claim 1, characterized in that the flow rate of water sprayed onto the heavy fraction flowing away after the thin layer evaporation operation is higher than 8 cu. m/h per ton of bottoms product treated per hour.

* * * * *